Feb. 21, 1939.  J. B. CHAMBERLAIN  2,148,057
FRUIT AND CORN DRIER
Filed Sept. 1, 1937
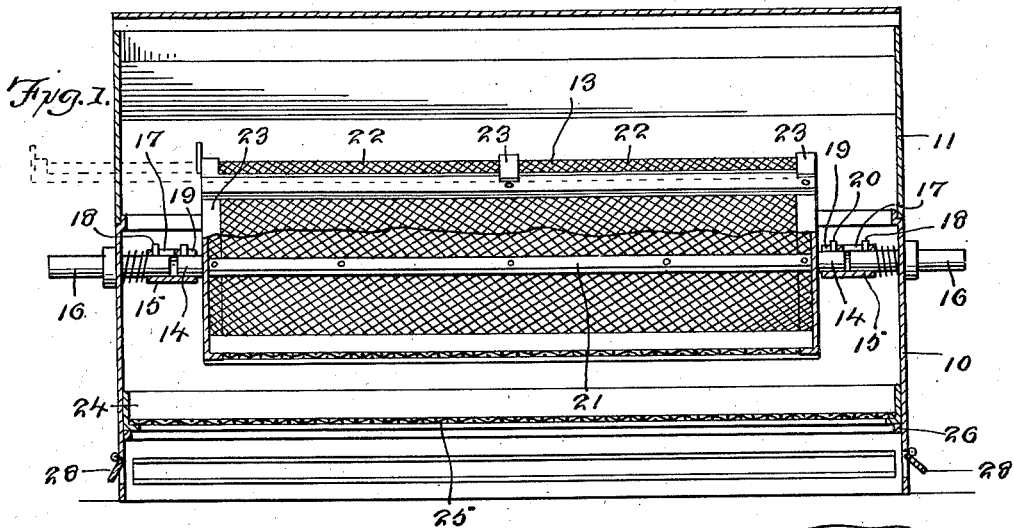
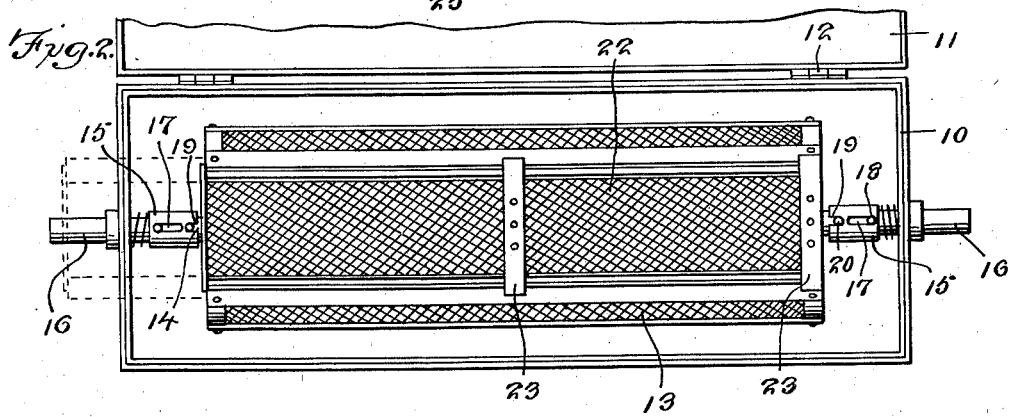
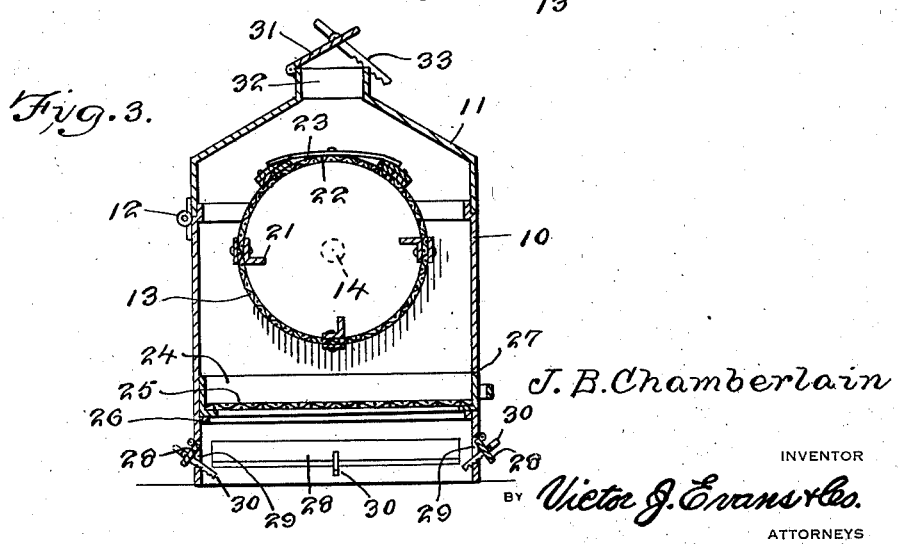
J. B. Chamberlain
INVENTOR
BY Victor J. Evans & Co.
ATTORNEYS Patented Feb. 21, 1939

2,148,057

UNITED STATES PATENT OFFICE 2,148,057

FRUIT AND CORN DRIER

John B. Chamberlain, Williamsburg, Pa., assignor of one-half to Chester D. Hetrick, Williamsburg, Pa.

Application September 1, 1937, Serial No. 162,044

1 Claim. (Cl. 34—5)

This invention relates to fruit and corn driers and has for an object to provide novel apparatus for agitating material while being heated to remove excess moisture and at the same time providing for adequate ventilation of the material during the drying operation.

A further object is to provide a device of this character which will be formed of a few simple strong and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view through drying apparatus constructed in accordance with the invention.

Figure 2 is a plan view of the apparatus showing the cover open to expose the drying drum.

Figure 3 is a cross sectional view of the apparatus showing certain of the ventilators open.

Referring now to the drawing in which like characters of reference designate similar parts in the various views, 10 designates an oven preferably formed of sheet metal, the same being open at the bottom so as to be supported upon a stove or other heating apparatus and permit of heat entering the interior of the oven.

The top 11 of the oven is hinged as shown at 12 to the top of the oven and may be rocked open as shown in Figure 2 to expose the interior of the oven.

A foraminous drum 13 is provided at the ends with gudgeons 14 which are received in spring pressed sleeves 15 carried by shafts 16 which project through the ends of the oven. Each sleeve is provided with a slot 17 which receives a guide pin 18 carried by the shaft and is also provided with a notch 19 which receives a pin 20 carried by the gudgeon. By retracting the sleeve longitudinally of its respective shaft the sleeve will be disengaged from the respective gudgeon of the cylinder and permit removal of the cylinder when desired. A crank handle or any power means may be connected to one of the shafts to rotate the cylinder at any desired speed.

The cylinder is provided internally with angle iron agitators 21 and also is provided with a sliding section 22 which is mounted in transversely disposed strap guides 23 which permit of the section being slid endwise to open position when the cover 11 of the oven 10 is open to permit dumping of the cylinder as will now be described.

Disposed in the bottom of the oven 10 is a drawer 24 having a foraminous bottom 25. The drawer is slidably mounted on cleats 26, as best shown in Figure 3, and is adapted to be pulled outwardly through an opening 27 in a wall of the oven. When it is desired to unload the cylinder the section 22 is slid endwise off from the cylinder and thereupon the cylinder is rotated to dump its contents into the drawer 24.

It is desirable that during the drying process the material be subjected to controlled ventilation and for this purpose a plurality of hinge ventilators 28 close respective openings 29 formed in the walls of the oven below the drawer. Each ventilator is provided with a ratchet bar 30 which engages the lower edge of the ventilator opening and adjustably supports the ventilator in open position.

Likewise a hinge ventilator 31 is disposed to close and open a chimney 32 on the oven top. The ventilator also is provided with a ratchet bar 33 which is adapted to engage the end of the chimney and pivotally hold the ventilator in adjusted open position.

From the above description it is thought that the construction and operation of the invention will be fully understood without further explanation.

What is claimed is:

A fruit and corn drier comprising an oven having an open bottom adapted to be supported upon heating apparatus and permit the heat entering the interior of the oven, a hinged top for the oven, a chimney on the hinged top, a ventilator in the chimney, a foraminous drum provided at the ends with gudgeons, shafts projecting through the ends of the oven and provided with spring pressed sleeves receiving said gudgeons to rotatably and detachably mount the drum in the oven, angle iron agitators on the inner surface of the drum, a sliding section on the drum to permit filling and dumping of the drum a drawer disposed in the bottom of the oven underneath the drum and having a foraminous bottom, and ventilators controlling respective openings in the walls of the oven below the drawer.

JOHN B. CHAMBERLAIN.